INVENTOR
PETER P. TONG

BY Donald F. Voss
ATTORNEY

United States Patent Office 3,539,893
Patented Nov. 10, 1970

3,539,893
HYBRID MOTOR CONTROL CIRCUIT FOR PROVIDING IMPROVED SPEED REGULATION
Peter P. Tong, Madison, Wis., assignor to International Business Machines Corporation, Armonk, N.Y., a corporation of New York
Filed Dec. 12, 1967, Ser. No. 690,022
Int. Cl. H02p 5/06
U.S. Cl. 318—331                6 Claims

ABSTRACT OF THE DISCLOSURE

A motor control circuit is provided which samples the analog back EMF voltage to determine how much energy should be applied to the motor. Variations in the amount of energy applied to the motor for speed regulation is achieved by applying current to the motor for variable lengths of time in relationship to the magnitude of the back EMF voltage.

BACKGROUND OF THE INVENTION

Field of the invention

This invention relates to motor control circuits and more particularly, to motor control circuits for speed regulation and still more particularly to speed regulation control circuits for DC motors. Speed regulation is provided by repetitively sensing the back EMF of the motor and this voltage is used to control the length of time that current is applied to the motor for each sensing cycle.

Description of the prior art

It is well known in the prior art to use the back EMF voltage of a motor to adjust its speed. However, the prior art does not provide speed regulation utilizing combined digital and analog techniques, i.e., repetitively sampling the back EMF to control the length of time that current is applied to the motor. The present invention provides for improved speed regulation for relatively inexpensive DC motors which normally have very poor speed regulation. Further, the improved speed control circuit of the invention is relatively inexpensive because it can be built with inexpensive electronic components.

SUMMARY OF THE INVENTION

The principal object of the invention is to provide an improved speed regulation circuit for motors which:
 (a) is relatively inexpensive,
 (b) provides food speed regulation for DC motors such as inexpensive printed circuit motors having poor speed regulation, and
 (c) utilizes a combination of analog and digital techniques to provide speed regulation.

DESCRIPTION

Figure 1:
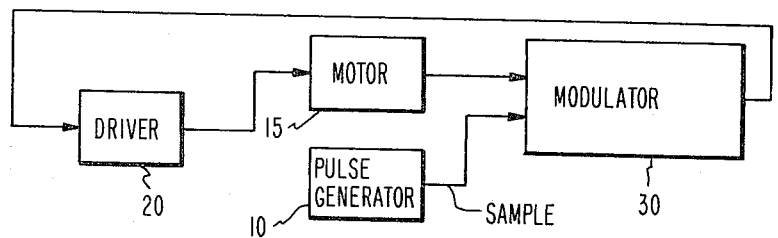
FIG. 1 is a block diagram illustrating the invention.

With reference to the drawing and particularly to FIG. 1, the invention is illustrated by way of example as including pulse generator 10 for providing sample pulses for sampling the back EMF of motor 15 to determine the length of time that current should be applied to motor 15 by driver 20. The back EMF voltage is sensed within modulator 30 which also receives the sample pulses from pulse generator 10. The output of modulator 30 controls driver 20.

Figure 2:
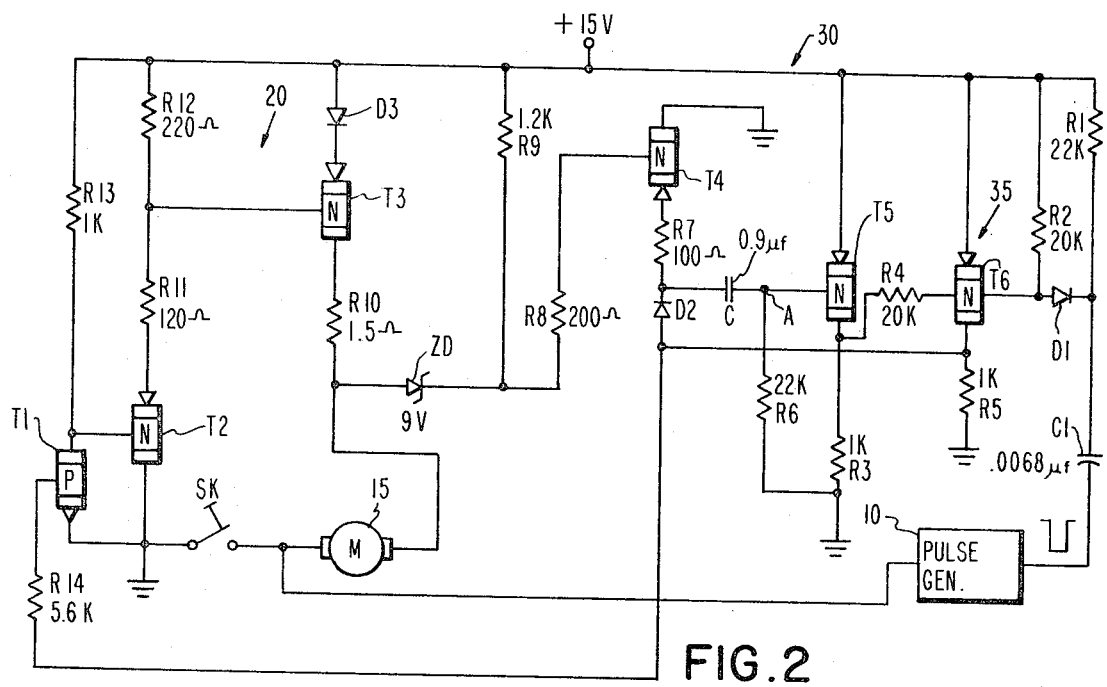
FIG. 2 is a schematic circuit diagram of a preferred embodiment of the invention.

In FIG. 2, modulator 30 is shown as including a single-shot multivibrator 35 formed by transistors T5 and T6. Transistor T4 functions to transfer the back EMF voltage to capacitor C. Generally speaking, the system operates in a negative feedback manner. If the back EMF voltage of the motor is low, the voltage across capacitor C will be high and the singleshot multivibrator 35 will be on for a longer period of time so that the speed of motor 15 can be increased by keeping driver 20 on for a longer period of time.

Driver 20, in this particular example, is formed by transistors T1, T2 and T3, which are connected as switching transistors, that is they will either be on or off. If the back EMF of the motor is high, the voltage across capacitor C will be low and the singleshot multivibrator of modulator 30 will be on for a shorter period of time whereby driver circuit 20 will be on for a shorter period of time. With driver 20 being on for a shorter period of time and consequently, the speed of motor 15 will be reduced. It should be noted that the magnitude of the current applied to motor 15 is substantially constant.

In order to understand the operation of driver circuit 20, singleshot multivibrator 35 which controls driver circuit 20 will now be described in greater detail. With manual switch SK unoperated or open, pulse generator 10 will not be providing output pulses to singleshot multivibrator 35. Transistor T5 will be conducting under this condition because its base emitter junction is forward biased, i.e., its emitter is more positive than its base. Resistor R4 is connected between the collector of transistor T5 and the base of transistor T6 functions as a feedback resistor. Resistor R2 is connected between the base of transistor T6 and the +15 volts supply. Resistor R2 serves as a leakage current resistor, and resistors R2 and R4 form a voltage divider network so that transistor T6 can be controlled by transistor T5. Hence, with transistor T5 conducting transistor T6 will be off because its emitter will not be sufficiently positive with respect to its base so as to permit transistor T6 to conduct. Resisor R6 connected between ground potential and the base of transistor T5 is a bias resistor for the base of transistor T5 to insure that transistor T5 will be on in a quiescent state. Resistors R3 and R5 connected in the collector circuits of transistors T5 and T6 respectively are load resistors.

With transistor T5 conducting, one side of capacitor C, point A, is at approximately +15 volts. Capacitor C charges through a path from the +15 voltage supply through transistor T5 and through transistor T4 to ground. The initial charge on capacitor C will be a maximum because there will be no back EMF voltage from motor 15. Capacitor C charges until the charge reaches approximately nine volts, i.e., the voltage at the cathode of Zener diode ZD. Thus, the voltage across capacitor C will initially be approximately six volts.

With transistor T5 conducting, and transistor T6 off, transistor T1 will be off. The base of transistor T1 is connected to the collector of transistor T6 via base current limiting resistor R14. Hence, with transistor T6 off, the base of transistor T1 is not sufficiently positive with respect to its emitter to turn transistor T1 on. Further, with transistor T1 off, transistor T2 will be off because its base which is connected to the collector of transistor T1 will not be sufficiently negative with respect to its emitter to turn transistor T2 on. The base of transistor T3 is connected to the emitter of transistor T2 via resistor R11 and to the +15 volt supply via resistor R12. Resistors R11 and R12 form a voltage divider network to supply base current for transistor T3. Thus, with transistor T2 off, transistor T3 will also be off.

The motor 15 is connected between the switch SK and resistor R10 which is connected in the collector circuit of transistor T3. Resistor R10 is a current limiting resistor for motor 15. Diode D3 which is connected between the emitter of transistor T3 and the +15 volt supply insures the turn off of transistor T3. In order for motor 15 to turn on it is necessary for switch SK to be closed and for transistor T3 to be on. Zener diode ZD is connected between one side of the motor, to the base of transistor T4 via resistor R8 and to the +15 volt supply via resistor R9. Resistor R8 together with resistor R7 which is connected in the emitter cricuit of transistor T4 provide a relatively high impedance path to the motor back EMF voltage which is produced when the motor is running. Resistor R9 functions as a bias resistor for Zener diode ZD.

With switch SK closed, pulse generator 10 will provide pulses to singleshot multivibrator 35 via capacitor C1. Resistor R1 and capacitor C1 form a differentiating network for differentiating the pulses from generator 10. Diode D1 which is connected between the base of transistor T6 and a point intermediate resistor R1 and capacitor C1 is a blocking diode whereby only negative going pulses will reach the base of transistor T6. Hence, a negative going pulse from generator 10 turns transistor T6 on. When transistor T6 switches on, its collector goes positive and diode D2 which is connected between the collector of transistor T6 and a point intermediate resistor R7 and capacitor C is forward biased whereby a positive signal appears at the base of transistor T5 to turn it off. The positive level of the collector of transistor T6 causes transistor T1 to turn on. With transistor T1 on, its collector goes negative because voltage will be dropped across load resistor R13 and consequently transistor T2 will be switched on. Conduction of transistor T2 causes its emitter to go negative and transistor T3 turns on. With transistor T3 on, sufficient voltage is applied across motor 15 to cause it to start running.

Figure 3:
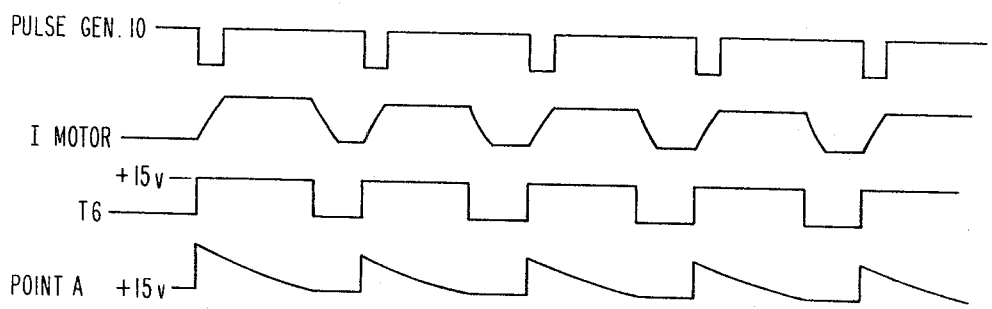
FIG. 3 is a waveform diagram for the circuit illustrated in FIG. 2.

During the time that transistor T5 is off, capacitor C discharges through resistor R6 to ground until a voltage is reached at point A where transistor T5 again switches on. Thus it is seen that capacitor C and resistor R6 determine the time constant for singleshot multivibrator 35. The voltage on capacitor C will be approximately 15 volts minus the nine bolt Zener diode voltage minus the back EMF voltage. Initially, the back EMF voltage of the motor will be zero and, as seen in FIG. 3, current will be applied to motor 15 for a maximum period of time, i.e., until transistor T5 switches on and transistor T6 switches off. Point A will be more positive than the emitter of transistor T5 until capacitor C discharges to a voltage where point A is approximately +15 volts.

With transistor T5 again conducting, no current will flow through motor 15. Transistor T6 will be switched on again by the next negative going pulse from generator 10. The frequency of pulse generator 10 is a function of motor 15, the load applied to the motor, and the speed at which regulation is to take place. With transistor T6 again conducting, transistors T1, T2 and T3 will be conducting and current will be applied to motor 15. This time current will be applied to motor 15 for a shorter period of time because there will be a back EMF voltage from motor 15. Conduction of transistor T4 is controlled by Zener diode ZD voltage plus the back EMF voltage. Transistor T4 which conducts more or less depending upon the back EMF voltage transfers the voltage at its base to capacitor C. Since there has been a back EMF voltage developed, then as capacitor C discharges, point A will reach a level of approximately 15 volts sooner than it did previously and transistor T5 will switch on sooner. Hence, current will be supplied to the motor for a shorter period of time. In FIG. 3, it is assumed that the motor 15 is at the regulated speed after the second pulse has been applied to singleshot multivibrator 35 from pulse generator 10. Of course, if the speed of the motor does vary so as to change the back EMF, then transistor T6 will be on for a longer or shorter period of time depending upon whether the back EMF voltage has decreased or increased and the desired operating speed will be restored. Zener diode ZD an capacitor C effectively determine the operating speed. Hence, the value of these components could be changed, if it were desirable to operate at different speeds.

It is thus seen that the pulses from pulse generator 10 effectively sample the back EMF voltage of motor 15 as detected within modulator 30. If the back EMF voltage deviates from the desired operating point because of a change in motor speed, then the length of time for supplying current to the motor will be changed to cause the motor to operate at the proper speed. It has been found that this invention is particularly suitable for speed regulation of printed circuit motors. Printed circuit motors generally have low inductance and therefore can be turned on and off quickly. Since these printed circuit motors are relatively inexpensive, it is particularly desirable to have a relatively inexpensive speed regulation control circuit.

While the invention has been particularly shown and described with reference to a preferred embodiment thereof, it will be understood by those skilled in the art that the foregoing and other changes in form and details may be made therein without departing from the spirit and scope of the invention.

What is claimed is:
1. Motor speed regulation apparatus comprising:
current switching means connected to said motor and selectively operable to control the application of current to said motor;
a singleshot multivibrator connected to control said current switching means, to prevent flow of current to said motor when said singleshot is in a quiescent state and to permit flow of current to said motor when fired, said singleshot multivibrator including a variable time constant network which determines the length of time that said singleshot remains fired;
means for repetitively firing said singleshot multivibrator with pulses having a time period exceeding the maximum time constant thereof; and
means for varying the time constant of said singleshot multivibrator directly proportional to the back EMF voltage of said motor.
2. The motor speed regulation apparatus of claim 1, wherein said variable time constant network includes a capacitor.
3. The motor speed regulation apparatus of claim 1, wherein said means for varying the time constant decreases the time constant of said singleshot multivibrator directly proportional to the back EMF voltage of said motor.
4. The motor speed regulation apparatus of claim 1, wherein said current switching means comprises:
a plurality of cascade connected switching transistors.
5. The motor speed regulation apparatus of claim 4, wherein said plurality of cascade connected switching transistors includes at least one NPN transistor and two PNP transistors with the collector of said NPN transistor being connected to the base of one of said PNP transistors and the emitter of said one of said PNP transistors being connected to the base of the other PNP transistor.
6. The motor speed regulation apparatus of claim 1, wherein said singleshot multivibrator includes two PNP transistors.

References Cited
UNITED STATES PATENTS 3,358,206    12/1967    Thiele _____ 318—341
3,436,635    4/1969     James et al. _____ 318—341 X ORIS L. RADER, Primary Examiner R. T. HICKEY, Assistant Examiner U.S. Cl. X.R.

318—341